(12) United States Patent
Lee et al.

(10) Patent No.: US 11,822,976 B2
(45) Date of Patent: Nov. 21, 2023

(54) EXTENDING MACHINE LEARNING WORKLOADS

(71) Applicant: Cisco Technology, Inc., San Jose, CA (US)

(72) Inventors: Myungjin Lee, Bellevue, WA (US); Harshit Daga, Atlanta, GA (US); Ramana Rao V. R. Kompella, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 17/538,130

(22) Filed: Nov. 30, 2021

(65) Prior Publication Data
US 2023/0168950 A1    Jun. 1, 2023

(51) Int. Cl.
*G06F 9/44* (2018.01)
*G06F 9/54* (2006.01)
*G06N 20/00* (2019.01)

(52) U.S. Cl.
CPC ............. *G06F 9/541* (2013.01); *G06N 20/00* (2019.01)

(58) Field of Classification Search
CPC ...................................................... G06F 9/541
USPC ........................................................ 719/328
See application file for complete search history.

(56) References Cited

U.S. PATENT DOCUMENTS

| | | | |
|---|---|---|---|
| 2019/0370086 A1 | 12/2019 | Heilper et al. | |
| 2020/0007460 A1* | 1/2020 | Guim Bernat | G06F 9/5077 |
| 2020/0104175 A1* | 4/2020 | Theimer | G06F 9/5027 |
| 2020/0118039 A1* | 4/2020 | Kocberber | G06N 5/01 |
| 2020/0125568 A1* | 4/2020 | Idicula | G06N 20/20 |
| 2020/0153896 A1 | 5/2020 | Kumar et al. | |
| 2021/0004712 A1 | 1/2021 | Sarferaz | |
| 2021/0092069 A1 | 3/2021 | Musleh et al. | |
| 2021/0182729 A1 | 6/2021 | George et al. | |

OTHER PUBLICATIONS

"Why You Need a Modern Infrastructure to Accelerate AI and ML Workloads", online: https://insidebigdata.com/2019/08/08/infrastructure-machine-learning-workloads/, Aug. 8, 2019, 4 pages, insideBIGDATA.

* cited by examiner

*Primary Examiner* — Timothy A Mudrick
(74) *Attorney, Agent, or Firm* — BEHMKE INNOVATION GROUP LLC; Kenneth J. Heywood; James J. Wong (57) ABSTRACT

In one embodiment, a device presents information regarding an upstream machine learning workload and a downstream machine learning workload via a user interface. The device receives, via the user interface, a request to form a combined machine learning workload by connecting the upstream machine learning workload and the downstream machine learning workload. The device identifies, after receiving the request, a node associated with the upstream machine learning workload and a node associated with the downstream machine learning workload. The device forms the combined machine learning workload by configuring the node associated with the upstream machine learning workload to use one or more connector application programming interfaces to send data from the upstream machine learning workload to the node associated with the downstream machine learning workload for consumption.

20 Claims, 8 Drawing Sheets

EXTENDING MACHINE LEARNING WORKLOADS

TECHNICAL FIELD

The present disclosure relates generally to computer networks, and, more particularly, to extending machine learning workloads.

BACKGROUND

Machine learning is becoming increasingly ubiquitous in the field of computing. Indeed, machine learning is now used across a wide variety of use cases, from analyzing sensor data from sensor systems to performing future predictions for controlled systems.

Unfortunately, running a machine learning workload is a complex and cumbersome task, today. This is because expressing a machine learning workload is not only tightly coupled with infrastructure resource management, but also embedded into the machine learning library that supports the workload. Consequently, users responsible for machine learning workloads are often faced with time-consuming source code updates and error-prone configuration updates in an ad-hoc fashion for different types of machine learning workloads.

In addition, workloads that consist of multiple machine learning models are often extremely complex and difficult to configure. Even if such a large-scale workload is configured, tracking its behavior represents another set of challenges and updating/modifying it can be error-prone.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device presents information regarding an upstream machine learning workload and a downstream machine learning workload via a user interface. The device receives, via the user interface, a request to form a combined machine learning workload by connecting the upstream machine learning workload and the downstream machine learning workload. The device identifies, after receiving the request, a node associated with the upstream machine learning workload and a node associated with the downstream machine learning workload. The device forms the combined machine learning workload by configuring the node associated with the upstream machine learning workload to use one or more connector application programming interfaces to send data from the upstream machine learning workload to the node associated with the downstream machine learning workload for consumption.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
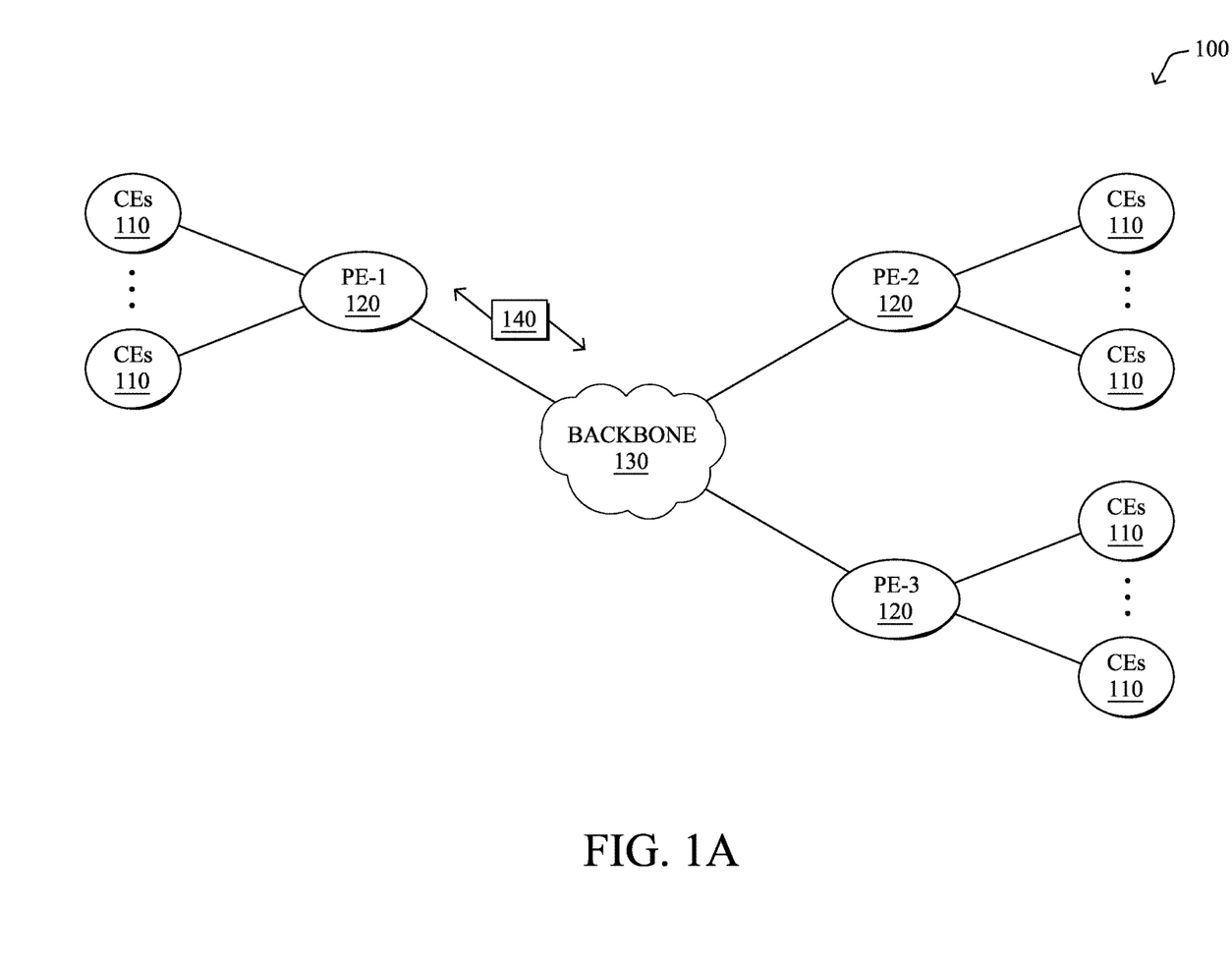
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
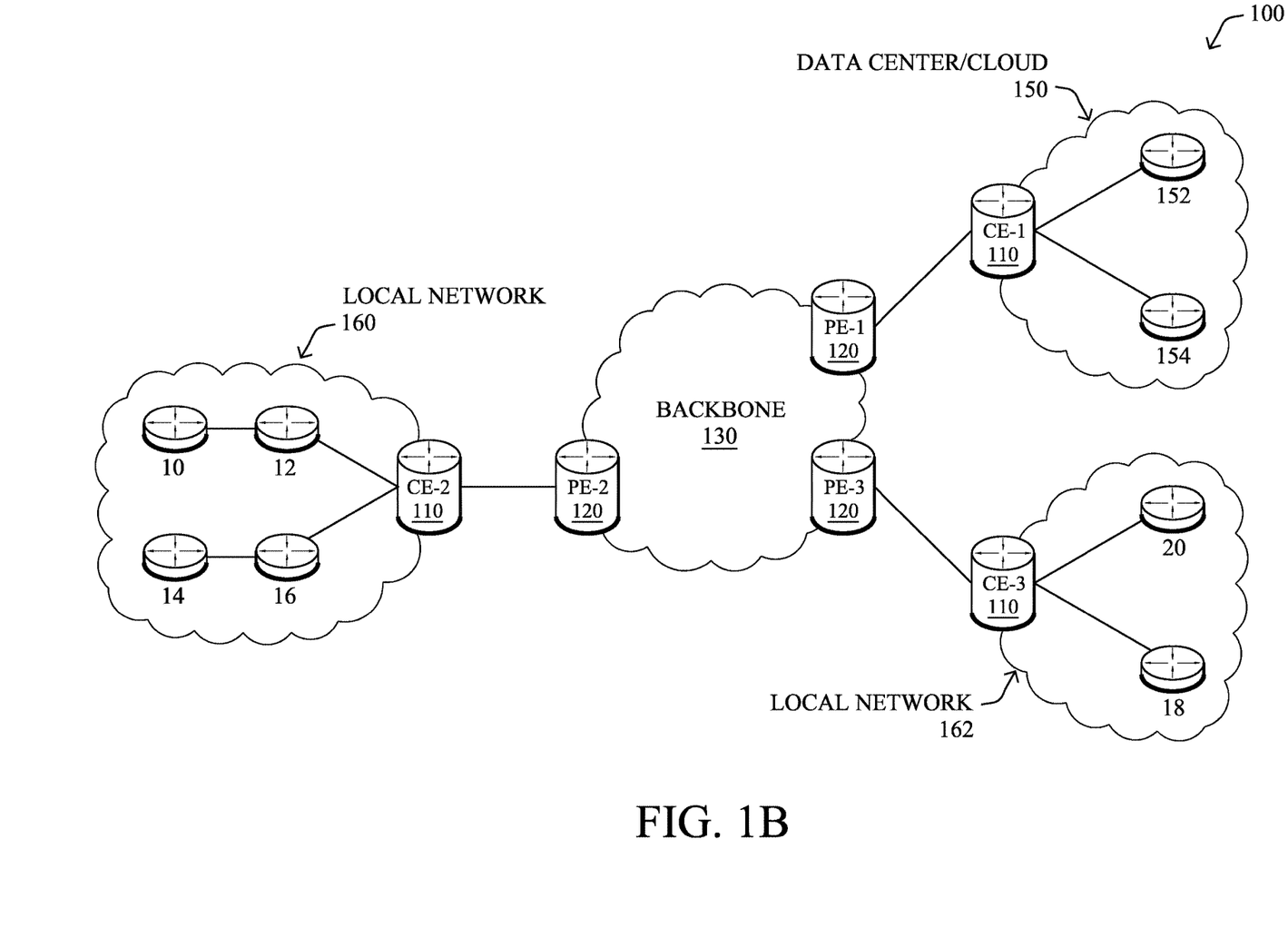

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
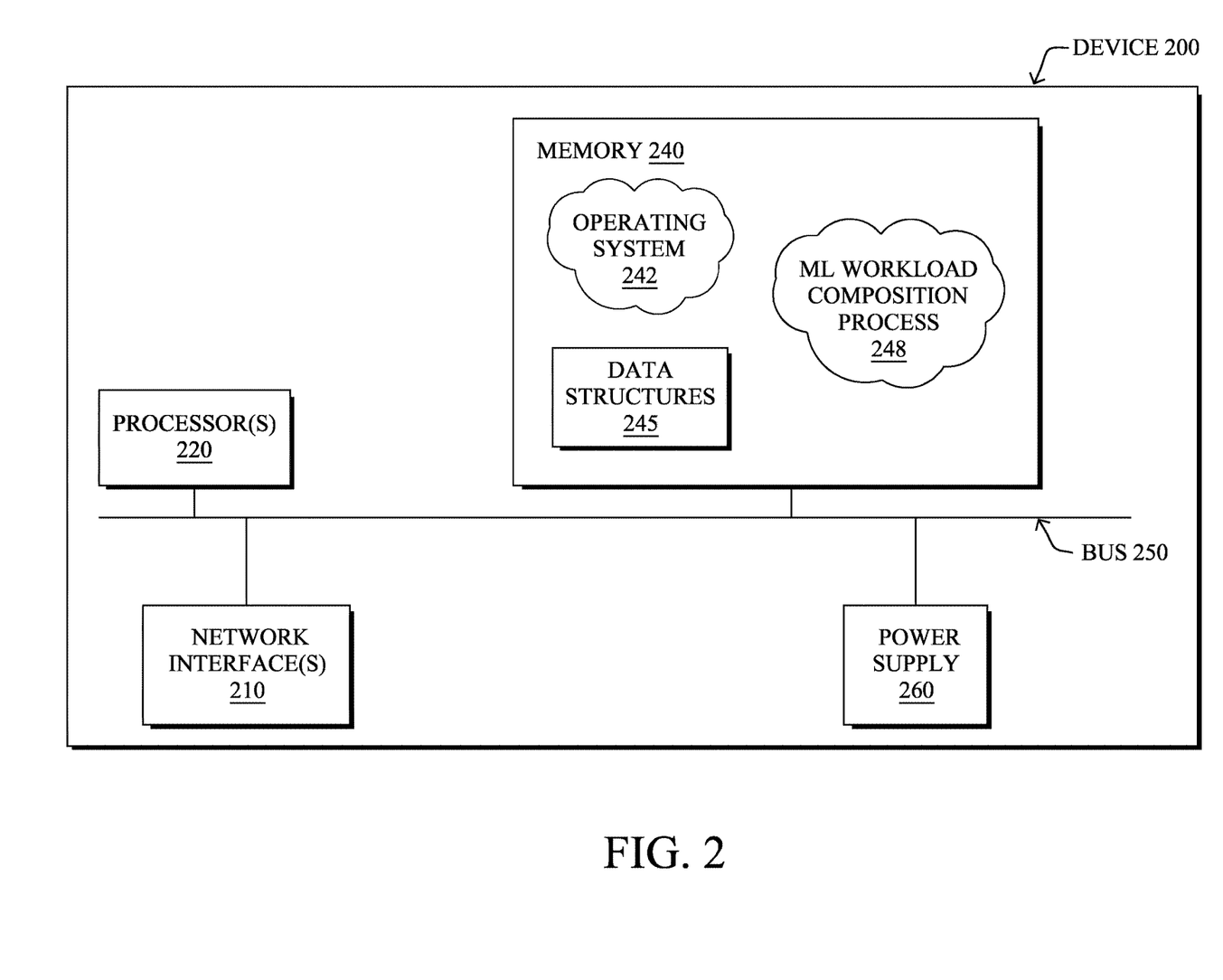
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a machine learning (ML) workload composition process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, ML workload composition process 248 may also include computer executable instructions that, when executed by processor(s) 220, cause device 200 to perform the techniques described herein. To do so, in some embodiments, ML workload composition process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, ML workload composition process 248 may employ, or be responsible for the deployment of, one or more supervised, unsupervised, or semi-supervised machine learning models. Generally, supervised learning entails the use of a training set of data, as noted above, that is used to train the model to apply labels to the input data. For example, the training data may include sample image data that has been labeled as depicting a particular condition or object. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that ML workload composition process 248 can employ, or be responsible for deploying, may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Unfortunately, running a machine learning workload is a complex and cumbersome task, today. This is because expressing a machine learning workload is not only tightly coupled with infrastructure resource management, but also embedded into the machine learning library that supports the workload. Consequently, users responsible for machine learning workloads are often faced with time-consuming source code updates and error-prone configuration updates in an ad-hoc fashion for different types of machine learning workloads, which may be used to perform tasks such as aggregated model training, performing inferences on a certain dataset, or the like. However, defining a machine learning workload, especially across a distributed set of nodes/sites, can also be a very cumbersome and error-prone task.

To simplify the definition of a workload, the techniques herein propose decomposing machine learning workloads into primitives/building blocks and decoupling core building blocks (e.g., the AI/ML algorithm) of the workload from the infrastructure building blocks (e.g., network connectivity and communication topology). The infrastructure building blocks are abstracted so that the users can compose their workloads in a simple and declarative manner. In addition, scheduling the workloads is straightforward and foolproof, using the techniques herein.

In various embodiments, the techniques herein propose representing a machine learning workload using the following building block types:

Role—this is logical unit that defines behaviors of a component. Hence, role contains a software piece. Role allows an artificial intelligence (AI)/machine learning (ML) engineer to focus on behaviors of a component associated with a role. At runtime, a role may consist of one or more instances, but the engineer only needs to work on one role at a time during the workload design phase without the need to understand any runtime dependencies or constraints.

Channel—this is a logical unit that abstracts the lower-layer communication mechanisms. In some embodiments, a channel provides a set of application programming interfaces (APIs) that allow one role to communicate with another role. Some of key APIs are ends( ), broadcast( ), send( ), and recv( ). Function ends( ) returns a set of nodes attached to the other end of a given channel. With this function, a node on one side of the channel can choose other nodes at the other end of the channel and subsequently call send( ) and recv( ) to send or receive data with each node. A channel eliminates any source code changes, even when the underlying communication mechanisms change.

Roles and channels may also have various properties associated with them, to control the provisioning of a machine learning workload. In some embodiments, these properties may be categorized as predefined ones and extended ones. Predefined properties may be essential to support the provisioning and set by default, whereas extended properties may be user-defined. In other words, to enrich the functionality of the roles and channels, the user/engineer may opt to customize extended properties.

By way of example, a role may have either or both of the following pre-defined properties:

Replica—this propel controls the number of role instances per channel. By default, this may be set to one, meaning there is one role instance per channel. However, a user may elect to set this property to a higher value, as desired.

Load Balance—this property provides the ability to load balance demands given to the role instances and to do fail-overs.

For a channel, there may be the following property:

Group By—this property accepts a list of values so that communication between roles in a channel are controlled by using the specified values. For example, this property can be used to control the communication boundary, such as allowing communications only in a specified geographic area in this property (e.g., U.S., Europe, etc.).

Using the above building blocks and properties, the system can greatly simplify the process for defining a machine learning workload for a user.

Figure 3:
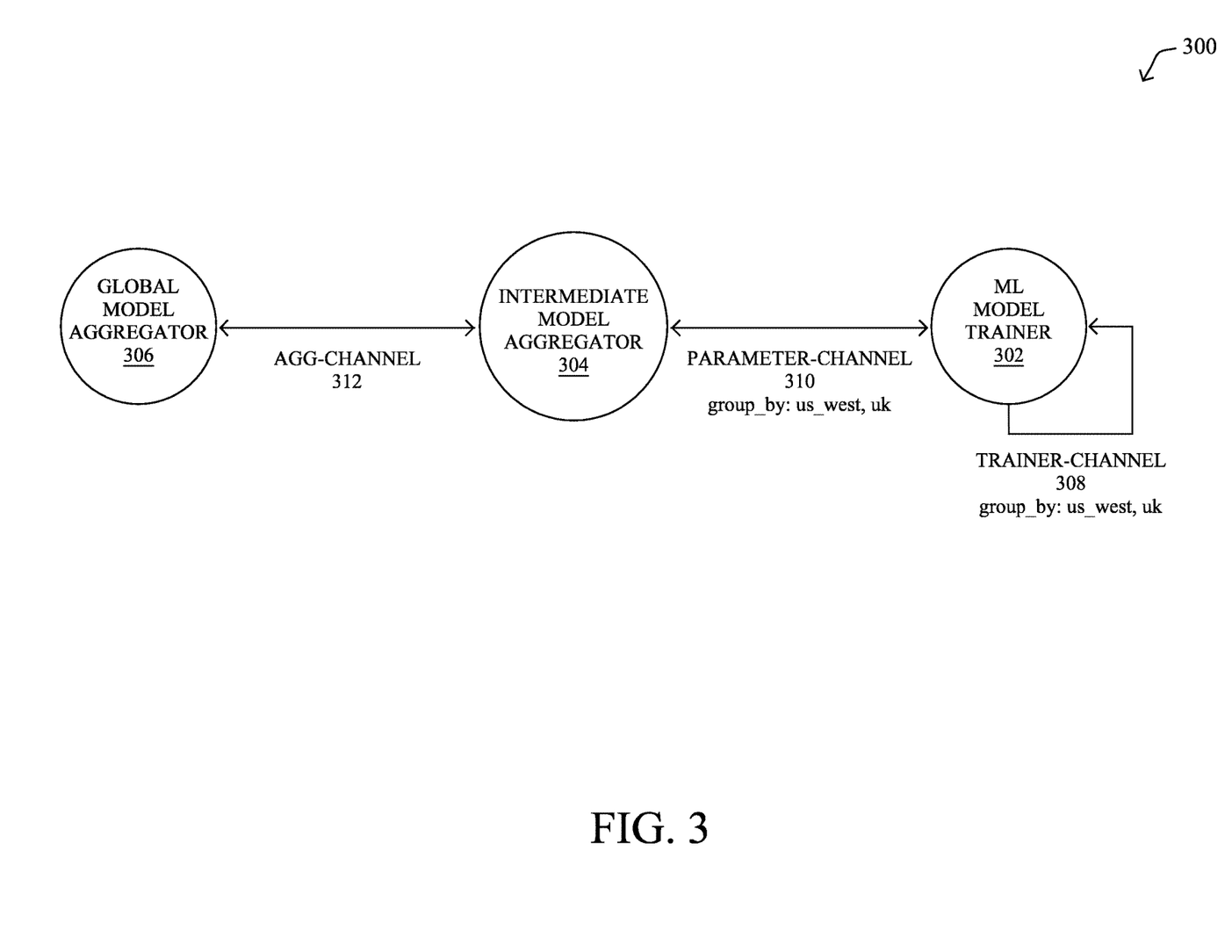
FIG. 3 illustrates an example template for a machine learning workload.

FIG. 3 illustrates an example template 300 for a machine learning workload, according to various embodiments. As shown, assume that a user wants to define a machine learning workload to train a machine learning model using data stored at different geographic locations. In a simple implementation, each site could simply transfer their respective datasets to a central location at which a model may be trained on that data. However, there are many instances in which the data is private, thereby preventing it from being sent off-site. For example, the datasets may include personally identifiable information (PII) data, medical data, financial data, or the like, that cannot leave their respective sites.

As shown, workload design template 300 consists of three roles: machine learning (ML) model trainer 302, intermediate model aggregator 304, and global model aggregator 306. Connecting them in template 300 may be three types of channels: trainer channel 308, parameter channel 310, and aggregation channel 312.

Trainer channels allows communication between peer trainer nodes at runtime. For instance, assume that the group by property is set to group trainer nodes into separate groups located in the western U.S. and the UK. In such a case, trainer channels may be provisioned between these nodes. Similarly, a parameter channel may enable communications between intermediate model aggregators, such as intermediate model aggregator 304 and trainer nodes in the various groups, such as model trainer 302. Finally, an aggregation channel may connect the intermediate model aggregator to global model aggregator 306.

Figure 4:
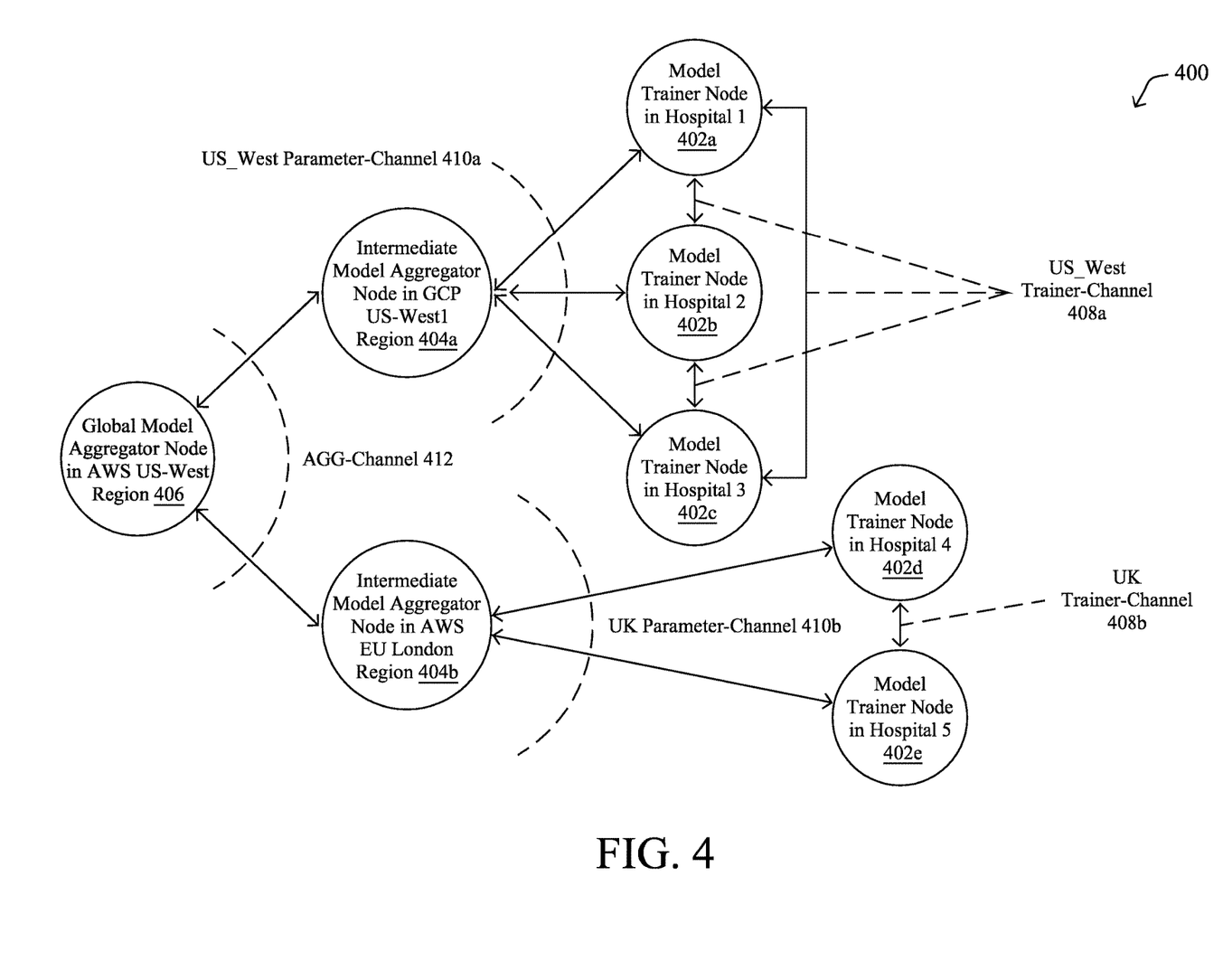
FIG. 4 illustrates an example of a machine learning workload defined in accordance with the template of FIG. 3.

FIG. 4 illustrates an example of a machine learning workload 400 defined in accordance with the template of FIG. 3, according to various embodiments. As shown, assume that the goal of the machine learning workload is to train a machine learning model to detect certain features (e.g., tumors, etc.) within a certain type of medical data (e.g., X-rays, MRI images, etc.). Such medical data may be stored at different hospitals or other locations across different geographic locations. For instance, assume that the medical data is spread across different hospitals located in the UK and the western US, each of which maintains its own training dataset.

To provision the machine learning workload across the different hospitals, a user may convey, via a user interface, definition data for the workload. For instance, the user may specify the type of model to be trained, values for the replica property, the number of datasets to use, tags for the group by property, any values for the load balancing property, combinations thereof, or the like.

Based on the definition data, the system may identify that the needed training datasets are located at nodes 402a-402e (e.g., the different hospitals). Note that the user does not need to know where the data is located during the design phase for machine learning workload 400, as the system may automatically identify nodes 402a-402e, automatically, using an index of their available data. In turn, the system may designate each of nodes 402a-402e as having training roles, meaning that each one is to train a machine learning model in accordance with the definition data and using its own local training dataset. In other words, once the system has identified nodes 402a-402e as each having training datasets matching the requisite type of data for the training, the system may provision and configure each of these nodes with a trainer role.

Assume now that the group by property has been set to group nodes 402a-402e by their geographic locations. Consequently, nodes 402a-402c may be grouped into a first group of trainer/training nodes, based on these hospitals all being located in the western US, by being tagged with a "us_west" tag. Similarly, nodes 402d-402e may be grouped into a second group of training nodes, based on these hospitals being located in the UK, by being tagged with a "uk tag.

For purposes of simplifying this example, also assume that the replica property is set to 1, by default, meaning that there is only one trainer role instance to be configured at each of nodes 402a-402e.

To connect the different sites/nodes 402a-402e in each group, the system may also provision and configure trainer channels between the nodes in each group. For instance, the system may configure trainer channels 408a between nodes 402a-402c within the first geographic group of nodes, as well as a trainer channel 408b between nodes 402d-402e in the second geographic group of nodes.

Once the system has identified nodes 402a-402e, it may also identify intermediate model aggregator nodes 404a-404b, to support the groups of nodes 402a-402c and 402d-402e, respectively. In turn, the system may configure model aggregator nodes 404a-404b with intermediate model aggregation roles. In addition, the system may configure parameter channels 410a-410b to connect the groups of nodes 402a-402c and 402d-402e with intermediate model aggregator nodes 404a-404b, respectively. These parameter channels 410a-410b, like their respective groups of nodes 402, may be tagged with the 'us_west' and 'uk' tags, respectively. In some instances, intermediate model aggregator nodes 404a-404b may be selected based on their distances or proximities to their assigned nodes among nodes 402a-402e. For instance, intermediate model aggregator node 404b may be cloud-based and selected based on it being in the same geographic region as nodes 402d-402e. Indeed, intermediate model aggregator node 404a may be provisioned in the Google cloud (gcp) in the western US, while intermediate model aggregator node 404b may be provisioned in the Amazon cloud (AWS) in the UK region.

During execution, each trainer node 402a-402e may train a machine learning model using its own local training dataset. In turn, nodes 402a-402e may send the parameters of these trained models to their respective intermediate model aggregator nodes 404a-404b via parameter channels 410a-410b. Using these parameters, each of intermediate model aggregator nodes 404a-404b may form an aggregate machine learning model. More specifically, intermediate model aggregator node 404a may aggregate the models trained by nodes 402a-402c into a first intermediate model and intermediate model aggregator node 404b may aggregate the models trained by nodes 402d-402e into a second aggregate model.

Finally, the system may also provision machine learning workload 400 in part by selecting and configuring global model aggregator node 406. Here, the system may configure a global aggregation role to global model aggregator node 406 and configure aggregation channels 412 that connect it to intermediate model aggregator nodes 404a-404b. Note that these aggregation channels may not be tagged with a geographic tag, either.

Once configured and provisioned, intermediate model aggregator nodes 404a-404b may send the parameters for their respective intermediate models to global model aggregator node 406 via aggregation channels 412. In turn, global model aggregator node 406 may use these model parameters to form a global, aggregated machine learning model that can then be distributed for execution. As a result of the provisioning by the system, the resulting global model will be based on the disparate training datasets across nodes 402a-402e, and in a way that greatly simplifies the definition process of the machine learning workload used to train the model.

As noted above, machine learning workloads are becoming increasingly complex. For instance, while machine learning workload 400 may be used for the federated learning of a particular machine learning model, the aggregated machine learning model may still be dedicated to only a single classification task (e.g., identifying tumors in medical imagery, identifying roadway hazards, etc.). However, there are also many learning tasks that involve the training of multiple machine learning models. Such large-scale machine learning workloads are often too complex to configure. Even when a large-scale machine learning workload is successfully configured, it is often very challenging to monitor it and updates to large-scale workloads also tend to be error-prone.

Extending Machine Learning Workloads

The techniques introduced herein allow for the definition of large and complex machine learning workloads in a simplified manner. In some aspects, the techniques herein allow multiple machine learning workloads to be connected, thereby forming combined workloads. While keeping workload structures, the proposed connector mechanism also allows for smaller workloads to be reused.

Illustratively, the techniques described herein may be performed by hardware, software, and/or firmware, such as in accordance with ML workload composition process 248, which may include computer executable instructions executed by the processor 220 (or independent processor of interfaces 210) to perform functions relating to the techniques described herein.

Specifically, according to various embodiments, a device presents information regarding an upstream machine learning workload and a downstream machine learning workload via a user interface. The device receives, via the user interface, a request to form a combined machine learning workload by connecting the upstream machine learning workload and the downstream machine learning workload. The device identifies, after receiving the request, a node associated with the upstream machine learning workload and a node associated with the downstream machine learning workload. The device forms the combined machine learning workload by configuring the node associated with the upstream machine learning workload to use one or more connector application programming interfaces to send data from the upstream machine learning workload to the node associated with the downstream machine learning workload for consumption Operationally, to illustrate the teachings herein, suppose that the objective of a machine learning engineer is to train a machine learning model to predict emotions from images showing human faces. Furthermore, assume that available set of input data includes video clips depicting human beings, animals, moving objects (e.g., cars), etc. The most naïve solution to this learning task would be to extract scenes of human face and label them, manually, which is not scalable at all.

As a better alternative, the task can be split into two parts: 1.) identifying humans among the images of the input data and 2.) clustering faces of those people that exhibit similar characteristics (e.g., lip shape, etc.). Thus, an alternate training approach would be to construct a large workload that performs both of these steps in a serialized fashion. However, this approach can be easily complicated and hard to manage, in many instances.

According to various embodiments, the techniques herein provide mechanisms that allow the above tasks to remain as separate and distinct machine learning workloads. In addition, a specialized connector is introduced herein that allows a machine learning engineer to easily connect these two workloads so as to form a combined workload that is able to perform the desired learning task (e.g., detecting emotions from faces). Indeed, with the proposed connector, these two parts can be managed in a modular fashion, improves reusability, and reduces management complexity.

Figure 5:
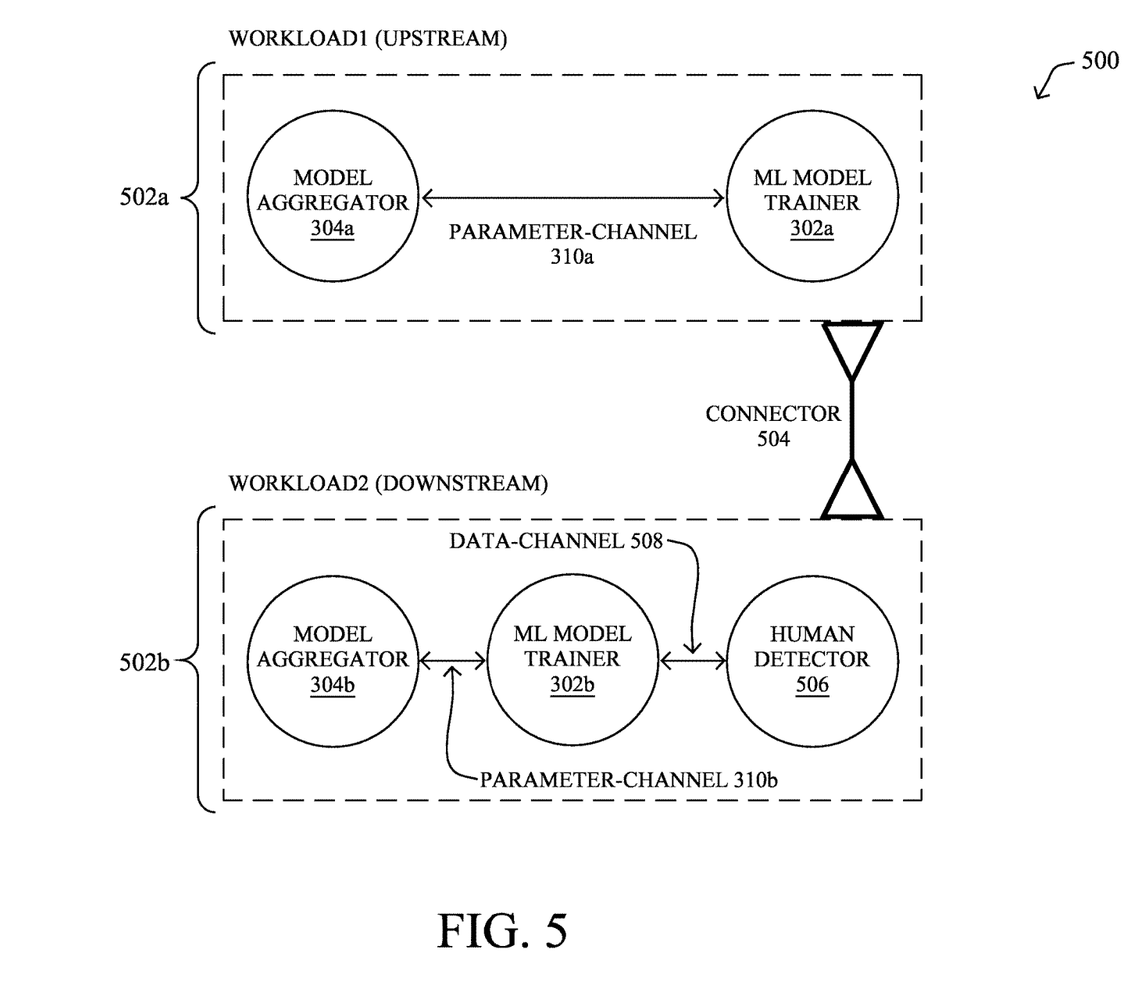
FIG. 5 illustrates an example of machine learning workloads being connected.

FIG. 5 illustrates an example 500 of machine learning workloads being connected, according to various embodiments. As shown, assume that there are two existing machine learning workloads: a first workload 502a and a second workload 502b. Each of these workloads may entail training machine learning models for different purposes such as different classification or inference tasks. In addition, first workload 502a and second workload 502b may also include computational nodes that are located at the same or different geographic locations.

For instance, first workload 502a may include at least a model trainer 302a and a model aggregator 304a that communicate with one another via a parameter channel 310a. Here, assume that first workload 502a is configured to produce a machine learning model able to detect and extract human faces from images.

Likewise, second workload 502b may be another machine learning workload configured to cluster images of faces based on their characteristics, such as lip shape, eye shape, eyebrow shape, combinations thereof, or the like. Here, an initial task in workload 502b may be performed by node 506, which first detects humans within images. These extracted images may then be sent via a data channel 508 to a model trainer 302b, to train a model to cluster the images by facial features. Such a resulting model can then be sent via a parameter channel 310b to model aggregator 304b and aggregated into a finalized model.

According to various embodiments, the two workloads 502a-502b may be connected using connector 504, thereby forming a combined workload in which data is passed from workload 502a (i.e., an 'upstream' workload) to workload 502b for consumption (i.e., a 'downstream' workload). By connecting the two workloads using connector 504, pictures of similar human facial expressions are automatically grouped together. Then, as a final step, labeling of the grouped facial expressions can be used to drive a third workload, which is not shown for brevity, that trains a model for predicting emotions based on the labeled facial pictures.

In other words, connector 504 may be another component/building block that is used to seamlessly inject an output of one workload into another workload. While keeping workload structures simple, connector 504 enables the definition of a bigger workload by creating upstream and downstream relationship among smaller workloads.

In various embodiments, a supervisory device overseeing the learning system may allow a user to interact with a user interface, to define the smaller workloads, as well as a combined workload, using the primitives/building blocks mentioned earlier, as well as connector 504. For instance, in some cases, the system may display graphical representations of first workload 502a and second workload 502b and receive a request to form a combined workflow that comprises the two through manipulation of a graphical icon representing connector 504. Of course, other interactions are also possible, such as through the input or output of text, using voice-based commands, or the like.

A key aspect of connector 504 is that it may be implemented in the network through a set of one or more connector APIs executed by the associated nodes of the connected workloads. For instance, once a user has indicated that first workload 502a and second workload 502b should be connected, the supervisory device may identify the corresponding nodes (e.g., the node/device executing model trainer 302a) and configure them such that workload 502a passes its data to workload 502b for use.

In further embodiments, the techniques herein can also be used to support architectures in which one upstream workload has multiple downstream workloads, or vice-versa.

Figure 6:
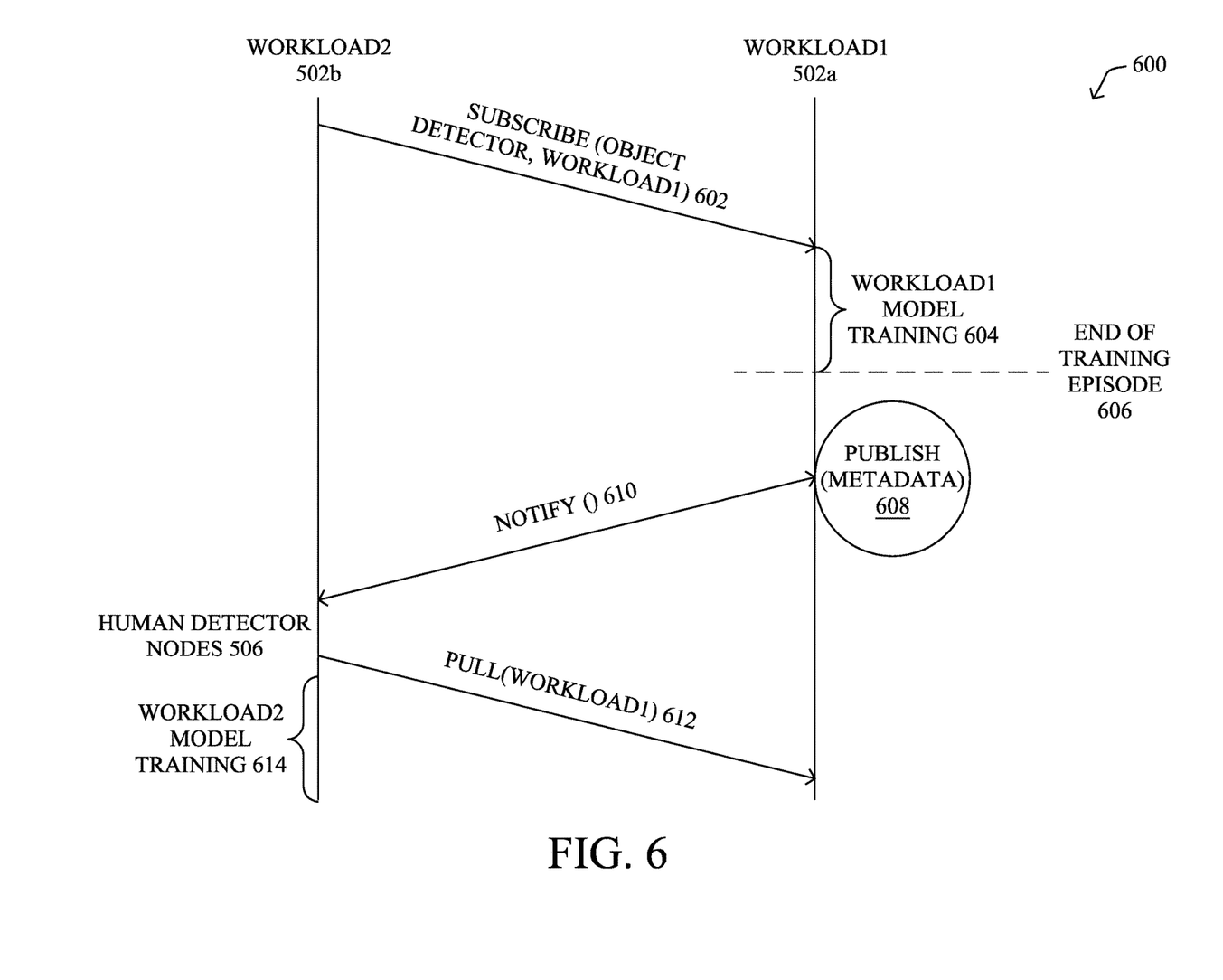
FIG. 6 illustrates an example simplified sequence diagram showing the interactions of nodes of connected workloads.

FIG. 6 illustrates an example simplified sequence diagram showing the interactions of nodes of connected workloads, according to various embodiments. In various embodiments, a workload connector, such as connector 504 in FIG. 5, may be implemented through any or all of the following APIs:
 subscribe(role, workload_id),
 pull(workload_id),
 notify( ),
 publish(metadata).

The first two APIs above are used by a downstream workload, whereas the latter two are used by an upstream workload. Thus, the system may send instructions to the nodes associated with the workloads to be connected, to utilize the above APIs, to form a connector channel between them. These instructions may be based, for instance, on the information specified in conjunction with the request to connect the workloads, such as the workload_id of the upstream workload, the role of the node, and/or the type of (meta)data to be shared via the connector. For instance, the specified data to be shared may take the form of a machine learning model, hyperparameters for a machine learning model, a training data size, or the like.

As shown, one or more nodes of downstream workload 502b may call the subscribe(role, workload_id) API of one or more nodes of upstream workload 502a, to subscribe to data produced by upstream workload 502a. For instance, in the case of identified people, a subscription call 602 may be made of the form subscribe(object detector, workload1). In turn, workload 502a may perform model training 604 over a period of time, which ends at time 606.

If the upstream workload 502a is already running in a cluster, then the upstream workload enables a downstream workload connection request without any source code modification in the upstream workload. It is assumed that admission (i.e., allowing the request or not) is controlled in an out-of-band fashion. This is possible by making a communication channel available by default for each workload. The communication channel is an infrastructure facility/functionality and is dedicated for connection among workloads.

Once model training is complete for a certain training episode, the node(s) associated with workload 502a may make a call 608 to the publish(metadata) API. Doing so may cause the metadata (e.g., trained ML model, etc.) to be published to a permanent store and/or in a local memory. In turn, the upstream node(s) may make a call 610 to the notify ( ) method, to inform all of the connected workloads as to the fact that new metadata is available. For instance, human detector nodes 506 of workload 502b may be informed that a new model is available to detect human faces within images.

Upon receiving a notification message, the node(s) of the downstream workload 502b may make a corresponding pull call 612 to the pull API method, to request the available data from upstream workload 502a. In turn, nodes 506 may use the obtained data to facilitate their own model training 614.

As would be appreciated, the connector mechanism introduced herein provides its functionality (e.g., extensibility and reusability) without any interference against the upstream workload. In other words, workload 502a may still function as its own discrete workload, while still being connected to workload 502b as part of a combined workload as well, in a transparent manner that does not require any changes to the source code of workload 502b.

Figure 7:
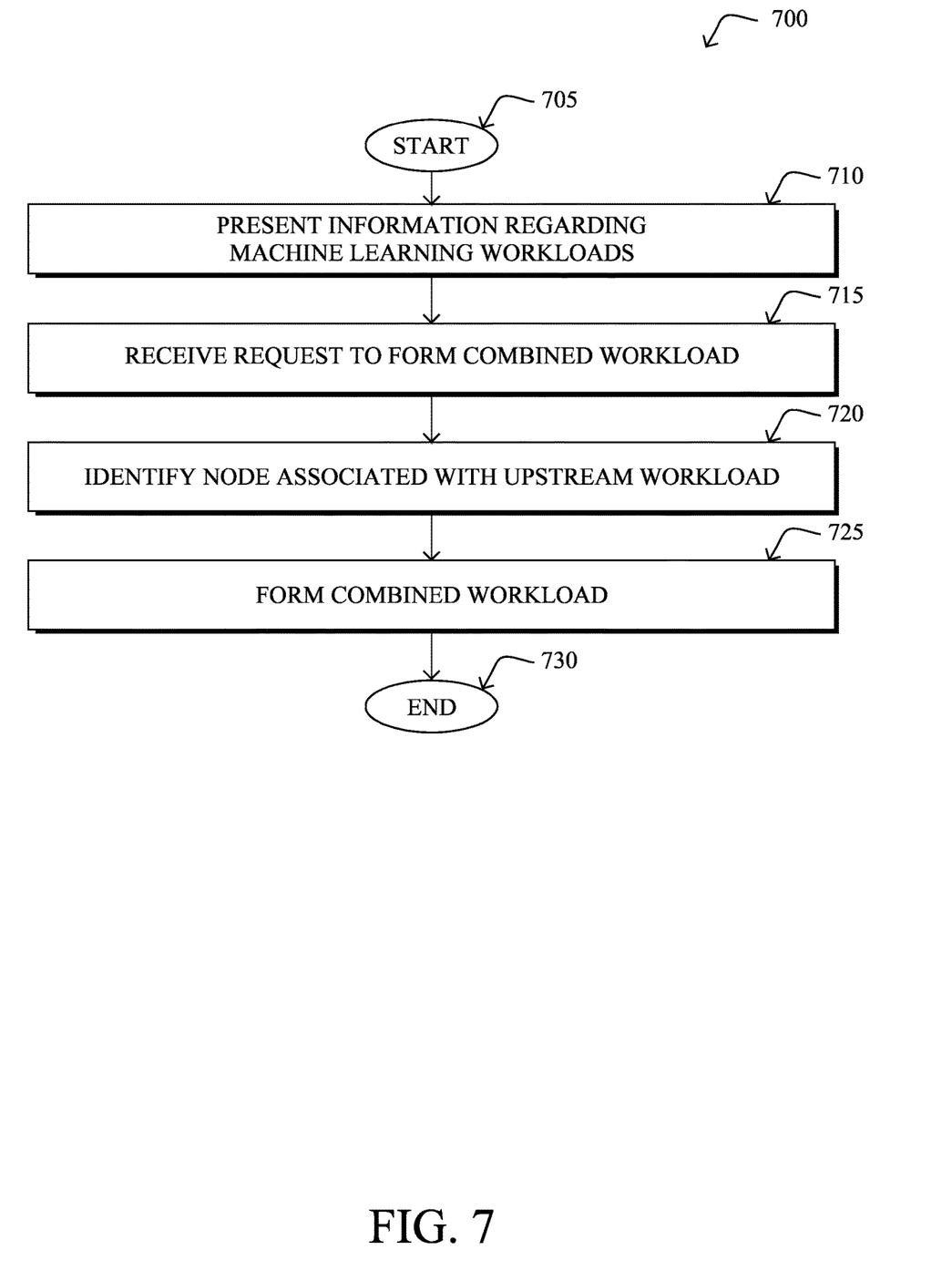
FIG. 7 illustrates an example simplified procedure for extending machine learning workloads.

FIG. 7 illustrates an example simplified procedure 700 (e.g., a method) for provisioning a machine learning workload, in accordance with one or more embodiments described herein. For example, a non-generic, specifically configured device (e.g., device 200), may perform procedure 700 by executing stored instructions (e.g., ML workload composition process 248). The procedure 700 may start at step 705, and continues to step 710, where, as described in greater detail above, the device may present information regarding an upstream machine learning workload and a downstream machine learning workload via a user interface. In some instances, the device may graphically represent the two workloads as combinations of primitives/building blocks through which the workloads may be defined. In other instances, the device may present the information using other indicia, such as lists, tables, interactive maps, or the like. In one embodiment, the downstream machine learning workload includes at least one model aggregator node.

At step 715, as detailed above, the device may receive, via the user interface, a request to form a combined machine learning workload by connecting the upstream machine learning workload and the downstream machine learning workload. In some instances, the request may be received through a user interacting with graphical representations of the workloads, such as by placing a graphical connector between the shown workloads. In some embodiments, the upstream machine learning workload trains a machine learning model for a different classification task than that of the downstream machine learning workload.

At step 720, the device may identify, after receiving the request, a node associated with the upstream machine learning workload and a node associated with the downstream machine learning workload, as described in greater detail above. In one embodiment, the node associated with the upstream machine learning workload is located in a different geographic location than that of the node associated with the downstream machine learning workload.

At step 725, as detailed above, the device may form the combined machine learning workload by configuring the node associated with the upstream machine learning workload to use one or more connector application programming interfaces to send data from the upstream machine learning workload to the node associated with the downstream machine learning workload for consumption. In various embodiments, forming the combined machine learning workload does not require a source code modification to the upstream machine learning workload. In one embodiment, the node associated with the upstream machine learning workload publishes the data via the one or more connector application programming interfaces. In a further embodiment, the device causes the node associated with the downstream machine learning workload to subscribe to the data published by the node associated with the upstream machine learning workload. In a further embodiment, the device also forms a second combined machine learning workload by configuring the node associated with the upstream machine learning workload to use the one or more connector application programming interfaces to send data from the upstream machine learning workload to a node associated with a second downstream machine learning workload for consumption. In various embodiments, the data may comprise hyperparameters of a machine learning model of the upstream machine learning workload. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the formation of extended/combined machine learning workloads. This allows a user to define very complex machine learning workloads, such as those that involve multiple machine learning tasks, in a simplified manner.

While there have been shown and described illustrative embodiments that provide for extending machine learning workloads, it is to be understood that various other adaptations and modifications may be made within the spirit and scope of the embodiments herein. For example, while certain embodiments are described herein with respect to machine learning workloads directed towards model training, the techniques herein are not limited as such and may be used for other types of machine learning tasks, such as making inferences or predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   presenting, by a device, information regarding an upstream machine learning workload and a downstream machine learning workload via a user interface;
   receiving, at the device and via the user interface, a request to form a combined machine learning workload by connecting the upstream machine learning workload and the downstream machine learning workload;
   identifying, by the device and after receiving the request, a node associated with the upstream machine learning workload and a node associated with the downstream machine learning workload; and
   forming, by the device, the combined machine learning workload by configuring the node associated with the upstream machine learning workload to use one or more connector application programming interfaces to send data from the upstream machine learning workload to the node associated with the downstream machine learning workload for consumption.

2. The method as in claim 1, wherein the upstream machine learning workload trains a machine learning model for a different classification task than that of the downstream machine learning workload.

3. The method as in claim 1, wherein forming the combined machine learning workload does not require a source code modification to the upstream machine learning workload.

4. The method as in claim 1, wherein the node associated with the upstream machine learning workload publishes the data via the one or more connector application programming interfaces.

5. The method as in claim 4, wherein forming the combined machine learning workload comprises:
   causing the node associated with the downstream machine learning workload to subscribe to the data published by the node associated with the upstream machine learning workload.

6. The method as in claim 1, wherein the data comprises hyperparameters of a machine learning model of the upstream machine learning workload.

7. The method as in claim 1, wherein the data comprises a machine learning model trained by the upstream machine learning workload.

8. The method as in claim 1, further comprising:
   forming a second combined machine learning workload by configuring the node associated with the upstream machine learning workload to use the one or more connector application programming interfaces to send data from the upstream machine learning workload to a node associated with a second downstream machine learning workload for consumption.

9. The method as in claim 1, wherein the node associated with the upstream machine learning workload is located in a different geographic location than that of the node associated with the downstream machine learning workload.

10. The method as in claim 1, wherein the downstream machine learning workload includes at least one model aggregator node.

11. An apparatus, comprising:
one or more network interfaces;
a processor coupled to the one or more network interfaces and configured to execute one or more processes; and
a memory configured to store a process that is executable by the processor, the process when executed configured to:
  present information regarding an upstream machine learning workload and a downstream machine learning workload via a user interface;
  receive, via the user interface, a request to form a combined machine learning workload by connecting the upstream machine learning workload and the downstream machine learning workload;
  identify, after receiving the request, a node associated with the upstream machine learning workload and a node associated with the downstream machine learning workload; and
  form the combined machine learning workload by configuring the node associated with the upstream machine learning workload to use one or more connector application programming interfaces to send data from the upstream machine learning workload to the node associated with the downstream machine learning workload for consumption.

12. The apparatus as in claim 11, wherein the upstream machine learning workload trains a machine learning model for a different classification task than that of the downstream machine learning workload.

13. The apparatus as in claim 11, wherein forming the combined machine learning workload does not require a source code modification to the upstream machine learning workload.

14. The apparatus as in claim 11, wherein the node associated with the upstream machine learning workload publishes the data via the one or more connector application programming interfaces.

15. The apparatus as in claim 14, wherein the apparatus forms the combined machine learning workload by:
  causing the node associated with the downstream machine learning workload to subscribe to the data published by the node associated with the upstream machine learning workload.

16. The apparatus as in claim 11, wherein the data comprises hyperparameters of a machine learning model of the upstream machine learning workload.

17. The apparatus as in claim 11, wherein the data comprises a machine learning model trained by the upstream machine learning workload.

18. The apparatus as in claim 11, further comprising:
forming a second combined machine learning workload by configuring the node associated with the upstream machine learning workload to use the one or more connector application programming interfaces to send data from the upstream machine learning workload to a node associated with a second downstream machine learning workload for consumption.

19. The apparatus as in claim 11, wherein the node associated with the upstream machine learning workload is located in a different geographic location than that of the node associated with the downstream machine learning workload.

20. A tangible, non-transitory, computer-readable medium storing program instructions that cause a device to execute a process comprising:
  presenting, by the device, information regarding an upstream machine learning workload and a downstream machine learning workload via a user interface;
  receiving, at the device and via the user interface, a request to form a combined machine learning workload by connecting the upstream machine learning workload and the downstream machine learning workload;
  identifying, by the device and after receiving the request, a node associated with the upstream machine learning workload and a node associated with the downstream machine learning workload; and
  forming, by the device, the combined machine learning workload by configuring the node associated with the upstream machine learning workload to use one or more connector application programming interfaces to send data from the upstream machine learning workload to the node associated with the downstream machine learning workload for consumption.

* * * * *

UNITED STATES PATENT AND TRADEMARK OFFICE
CERTIFICATE OF CORRECTION

| | |
|---|---|
| PATENT NO. | : 11,822,976 B2 |
| APPLICATION NO. | : 17/538130 |
| DATED | : November 21, 2023 |
| INVENTOR(S) | : Myungjin Lee et al. |

It is certified that error appears in the above-identified patent and that said Letters Patent is hereby corrected as shown below:

In the Specification

Column 7, Line 8 please amend as shown:
Replica—this property controls the number of role instances Signed and Sealed this
Twentieth Day of February, 2024

Katherine Kelly Vidal
*Director of the United States Patent and Trademark Office*